United States Patent
de Silva et al.

(10) Patent No.: US 9,948,778 B2
(45) Date of Patent: Apr. 17, 2018

(54) AUTOMATED USE OF INTERACTIVE VOICE RESPONSE SYSTEMS

(71) Applicant: TruVerse, Inc., Los Altos, CA (US)

(72) Inventors: Mahi de Silva, Los Altos Hills, CA (US); Manoj Malhotra, Los Altos, CA (US)

(*) Notice: Subject to any disclaimer, the term of this patent is extended or adjusted under 35 U.S.C. 154(b) by 0 days.

(21) Appl. No.: 15/271,201

(22) Filed: Sep. 20, 2016

(65) Prior Publication Data
US 2017/0374198 A1    Dec. 28, 2017

Related U.S. Application Data

(60) Provisional application No. 62/355,199, filed on Jun. 27, 2016.

(51) Int. Cl.
| H04M 1/64 | (2006.01) |
| H04M 3/51 | (2006.01) |
| H04L 12/58 | (2006.01) |
| H04M 7/00 | (2006.01) |

(52) U.S. Cl.
CPC .......... *H04M 3/5166* (2013.01); *H04L 51/02* (2013.01); *H04M 3/5191* (2013.01); *H04M 7/0078* (2013.01)

(58) Field of Classification Search
CPC .. H04M 3/5166; H04M 3/5183; H04M 3/493; H04M 3/5191; H04L 51/02
USPC ...................................................... 379/88.17
See application file for complete search history.

(56) References Cited

U.S. PATENT DOCUMENTS

| 8,000,454 | B1* | 8/2011 | Or-Bach | G06Q 20/10 |
| | | | | 379/100.14 |
| 9,100,478 | B1* | 8/2015 | Benway | H04M 3/493 |
| 2010/0296638 | A1* | 11/2010 | Wang | H04M 3/4217 |
| | | | | 379/88.04 |
| 2013/0030993 | A1* | 1/2013 | Peace | G06Q 20/4016 |
| | | | | 705/39 |
| 2014/0122053 | A1* | 5/2014 | Lotan | H04M 3/493 |
| | | | | 704/2 |
| 2015/0172463 | A1* | 6/2015 | Quast | H04M 3/4936 |
| | | | | 379/88.01 |
| 2015/0215455 | A1* | 7/2015 | Perotti | H04M 3/493 |
| | | | | 379/88.01 |
| 2016/0360037 | A1* | 12/2016 | van Rensburg | H04M 3/5233 |
| 2018/0048594 | A1 | 2/2018 | de Silva et al. | |

FOREIGN PATENT DOCUMENTS

| WO | WO2018005087 A1 | 1/2018 |
| WO | WO2018031765 A1 | 2/2018 |

* cited by examiner

*Primary Examiner* — Van D Huynh
(74) *Attorney, Agent, or Firm* — Carr & Ferrell LLP

(57) ABSTRACT

Systems and methods for automating the use of an IVR system are provided herein. A method includes traversing an interactive voice response (IVR) system using a chatbot, determining a menu structure of the IVR system using audio processing, the menu structure comprising selectable telephonic options, and storing the menu structure in a database. The menu structure, such as an IVR tree, can be used by the chatbot to fulfill user tasks and other requests.

26 Claims, 5 Drawing Sheets

AUTOMATED USE OF INTERACTIVE VOICE RESPONSE SYSTEMS

CROSS REFERENCE TO RELATED APPLICATIONS

This non-provisional application claims the benefit and priority of U.S. Provisional Application Ser. No. 62/355,199, filed on Jun. 27, 2016, which is hereby incorporated by reference herein in its entirety, including all references and appendices cited therein. This non-provisional application is related to U.S. Provisional Application Ser. No. 62/373,900, filed on Aug. 11, 2016, which is also hereby incorporated by reference herein in its entirety, including all references and appendices cited therein.

FIELD OF THE INVENTION

The present technology is directed to systems and methods that automate user interactions with interactive voice responses systems (IVR). Some embodiments include virtual entities such as a system whose user interface are chatbots that are configured to learn an IVR tree of an IVR system and execute tasks against the IVR in an automated manner. The chatbots can also convert the IVR tree into a graphical user interface (GUI) that a user can utilize in a webpage or messaging application.

SUMMARY

According to some embodiments, the present technology is directed to a method, comprising: (a) traversing an interactive voice response (IVR) system using a chatbot; (b) determining a menu structure of the IVR system using audio processing, the menu structure comprising selectable telephonic options; and (c) storing the menu structure in a database.

The method can also include (d) establishing a telecommunications session with the IVR system; (e) executing a task against the menu structure by the chatbot entering one or more of the selectable telephonic options; (f) receiving a response from the IVR system; and (g) transmitting a response to a requestor.

According to some embodiments, the present technology is directed to a method, comprising: (a) scraping an IVR menu of an IVR system using audio processing; and (b) providing a chatbot that interacts with a user by any of: (i) responding to a request from the user using the scraped IVR tree; and (ii) generating a visual representation of the scraped IVR tree.

The method can also include (c) establishing a telecommunications session with the IVR system; (d) executing a task against the menu structure by the chatbot entering one or more of the selectable telephonic options; (e) entering user-stored information using telephonic input during the telecommunications session; (f) receiving a response from the IVR system; and (g) transmitting a response to a requestor.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally, the present disclosure is directed to systems and methods that allow a user to interact with an interactive voice response (IVR) system using a chatbot, rather than using traditional methods that require the presence of the user to enter specific touch tone keypad responses through a telephone.

The chatbot or other method can be used to parse out the structure of an IVR tree of the IVR system. In some embodiments, the IVR system uses natural language processing to determine the IVR tree by inspecting for keywords and phrases. Once the IVR tree is mapped by the chatbot, an end user can utilize the chatbot to communicate with the IVR system.

In some embodiments, the user can utilize a webform, a messaging application, or even speak a request or task. For example, the user can request a change in reservation time at a particular restaurant. The user input is processed by the chatbot into instructions that correspond to the IVR tree. For example, the chatbot can create a series of virtual touch tone keypad inputs that will enter required information in order to elicit a desired response from the IVR system. In one embodiment, the chatbot can input end user information into the IVR system when prompted; such as usernames, pin codes, account numbers, and so forth to complete a requested task.

Some embodiments include the chatbot creating a graphical user interface (GUI) that is representative of the IVR tree. For example, the chatbot can provide the GUI on a website or within a messaging application. The GUI includes selectable buttons or other response types for the specific touch tone keypad responses of the IVR tree. When the chatbot receives the responses from input into the GUI, the chatbot can translate the GUI input into specific touch tone keypad responses required to navigate the IVR system and perform the desired task.

These and other advantages of the present disclosure are provided herein in greater detail.

Figure 1:
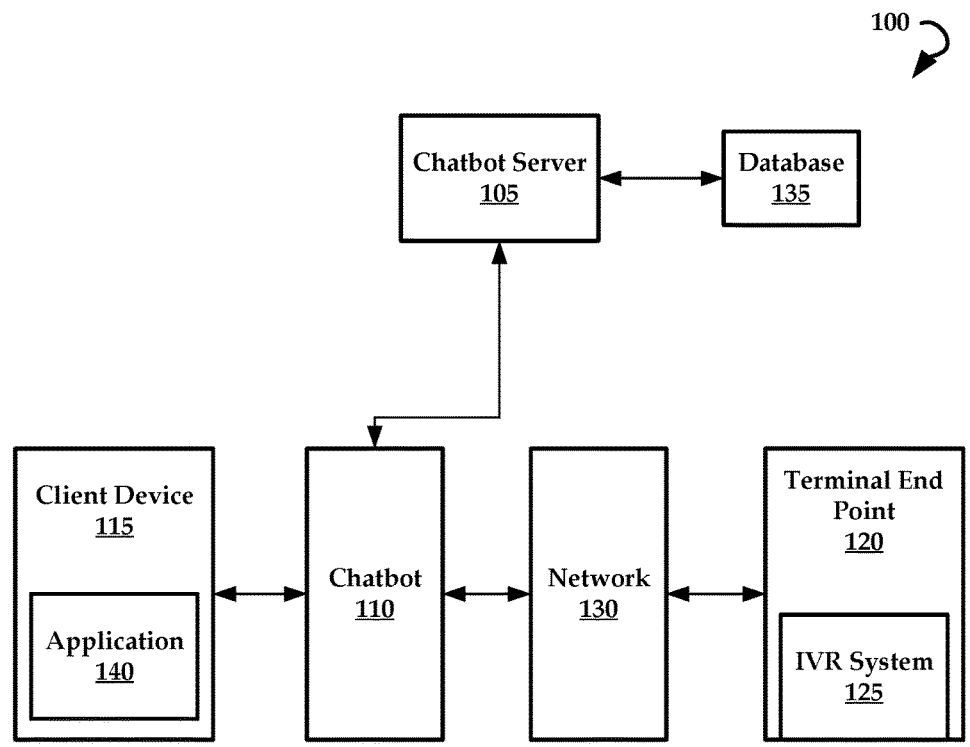
FIG. 1 is a schematic diagram of a system that can be utilized to practice aspects of the present disclosure.

FIG. 1 is a schematic diagram of an example system 100 that is used to practice aspects of the present disclosure. The system 100 comprises a chatbot server 105 that creates and deploys chatbots, such as a chatbot 110. The chatbot 110 provides a communicative interface between a client device 115 (e.g., end user computing system) and a terminal end point 120. Examples of terminal end points include an enterprise system or any other system that implements an interactive voice response (IVR) system 125.

The components of the system 100 can be communicatively coupled with one another using a private or public network such as network 130. The network can also comprise a wired telecommunications link that terminates at the IVR system 125. In some embodiments, the IVR system 125 uses voice over IP (VoIP) technology rather than wired telecommunications.

Additional example networks may include or interface with any one or more of, for instance, a local intranet, a Personal Area Network (PAN), a Local Area Network (LAN), a Wide Area Network (WAN), a Metropolitan Area Network (MAN), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, Digital Subscriber Line (DSL) connection, an Ethernet connection, an Integrated Services Digital Network (ISDN) line, a dial-up port such as a V.90, V.34 or V.34bis analog modem connection, a cable modem, an Asynchronous Transfer Mode (ATM) connection, or a Fiber Distributed Data Interface (FDDI) or Copper Distributed Data Interface (CDDI) connection. Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), Cellular Digital Packet Data (CDPD), Research in Motion (RIM), 4 G LTE (long-term evolution and similar networks), Limited duplex paging network, Bluetooth radio, or an IEEE 802.11-based radio frequency network.

The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In some embodiments, the chatbot server 105 deploys a chatbot 110 to interact with the IVR system 125 prior to an end users usage of the IVR system 125.

In one embodiment, the chatbot 110 is configured to contact the IVR system 125 and create a mapping of an IVR structure of the IVR system 125. In one embodiment, the chatbot 110 initiates a telecommunications session with the IVR system 125 over a wired or wireless telecommunications link. In another embodiment the chatbot 110 initiates a session with the IVR system 125 using a VoIP link.

Generally, the chatbot 110 scrapes an IVR tree/structure from the IVR system 125 using audio processing. The IVR structure comprises the choices and prompts available to a user when interacting with the IVR system 125. For example, the IVR structure can include a basic greeting or request that the user select a language. The user can select "1" for English or "2" for Spanish. Advantageously, the chatbot 110 can provide translation services that can use either the English or Spanish version of the IVR process, as will be discussed in greater detail below.

Once the user has made their selection, the user is provided with a basic set of options. For example, if the enterprise is a restaurant, the menu options could include hours of operation, location, new reservation, cancel reservation, update reservation, and so forth. Each of these options is associated with a unique touch tone keypad input. The IVR menu can include various additional options as the user traverses the menu depending on their particular needs.

The chatbot 110 is configured to traverse each option of the IVR menu, exploring and identifying each part of the IVR menu. This allows the chatbot 110 to create a mapping of the entirety of the IVR menu to construct an IVR tree.

Figure 2:
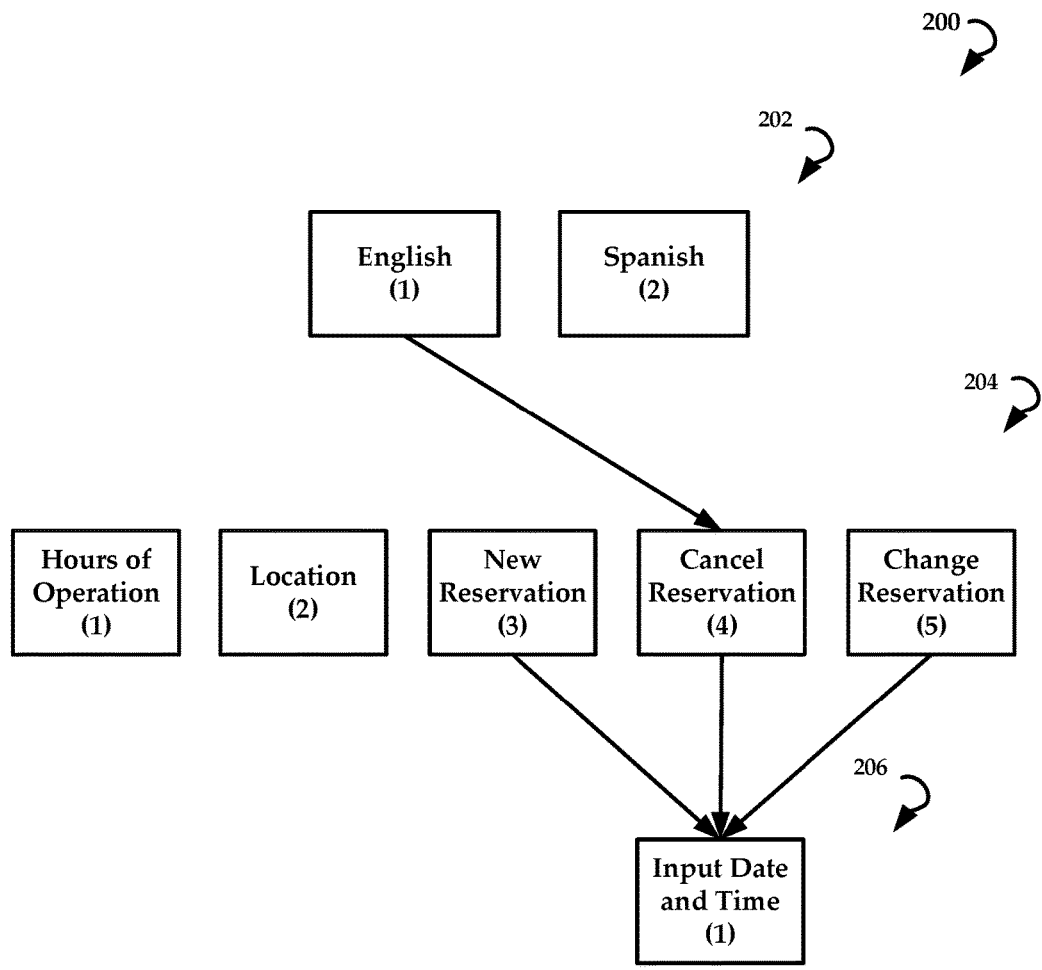
FIG. 2 is a schematic view of an example IVR tree generated by a chatbot of the present disclosure.

An example IVR tree is illustrated in FIG. 2. The IVR tree 200 comprises an initial, or landing tier 202, with two options, "1" for English or "2" for Spanish. A second tier 204 of the IVR tree 200 includes options of hours of operation, location, new reservation, cancel reservation, update reservation; each being assigned a unique touch tone keypad input from 1-5. For purposes of explanation, the IVR tree 200 comprises a third tier 206 that includes an option to input a date and time by pressing a touch tone keypad input "1". In some embodiments the IVR menu can specify a series of touch tone keypad inputs to specify the date and time. In another embodiment the IVR specifies that the user leave a voice message with a desired date and time, as well as a call back number or name. The chatbot 110 can be configured to interact with the IVR menu to use either or both options.

Regardless of the requirements of the IVR menu, the chatbot 110 can utilize audio processing functionalities, such as natural language parsing or similar techniques to create a map or IVR tree 200. In some embodiments, the chatbot 110 can recognize keywords or phrases such as "English" and "1." The chatbot 110 can utilize the IVR tree 200 as a script to traverse the IVR system 125 in a quick and autonomous manner based on a request from a user.

In sum, the chatbot 110 can determine a menu structure of the IVR system 125 using audio processing. The menu structure comprises selectable telephonic options for each level and selection of the IVR menu.

In some embodiments, the chatbot 110 can store the menu structure (e.g., IVR tree 200) in a database 135 for further use, such as when a user desires to utilize the IVR system 125 or interact with the entity/enterprise represented by the IVR system 125.

According to some embodiments, the chatbot 110 can be executed to periodically (such as according to a schedule), initiate a call to the IVR system 125 to update the IVR tree 200. This allows the chatbot 110 to maintain an accurate representation of the IVR tree/structure 200 of the IVR system 125.

In some embodiments, the chatbot 110 can be configured to create and maintain IVR trees (e.g. IVR tree 200) for a plurality of different IVR systems (e.g. IVR system 125) frequently used by the end user. In other embodiments, the IVR tree analysis is performed on-the-fly or in near-real time when the end user requires the use of the IVR system 125.

In some embodiments, the end user can request that the chatbot 110 perform an action that requires the use of the IVR system 125. For example, the end user types or speaks a requested action into a messaging application 140 (or any other application that allows communication with the chatbot 110). The user can also type in their requested action through a web portal, webpage, and other similar means. Any medium that is capable of receiving text or audible input can be utilized to input a request or action.

In this example, the end user speaks the phrase "I want to cancel my reservation for The Restaurant for 7:00 pm on Friday" into an application on their device. The chatbot 110 uses natural language parsing to determine the name of the restaurant to be called. The chatbot 110 can use a phone number for The Restaurant stored in the end user's device or from a web search of the user's location. That is, the chatbot 110 can use a relative or absolute location of the user as determined from the device (e.g., a Smartphone) used to tailor the requested action to a specific location. The chatbot 110 can display the selected number to the end user for confirmation. Upon confirmation (if required) the chatbot 110 then creates an instruction set that includes an ordered combination of touch tone keypad inputs that quickly navigate the chatbot 110 to the desired location within the IVR tree 200.

Next, the chatbot 110 establishes a telecommunications session with the IVR system 125. The chatbot 110 executes the instruction set by inputting virtual/generated touch tone keypad inputs to navigate to the portion of the IVR menu that allows for cancellation of a reservation. The chatbot 110 can either enter touch tone keypad inputs that correspond to the date and time specified by the end user or output an audio file of the end user's request that includes the date and time.

In sum, the chatbot 110 can execute a task against the menu structure by the chatbot 110 entering one or more of the selectable telephonic options included in the IVR menu.

In another embodiment, the chatbot 110 can play the end user's natural language request for recordation into the IVR system 125, if the IVR system 125 allows the user to leave a voicemail message.

In some embodiments, the IVR system 125 generates a response, such as when a user is requesting an account balance. In these embodiments, the chatbot 110 receives a response from the IVR system 125 and transmits a response to a requestor, such as through a messaging application or other application used by the end user to interact with the chatbot 110.

The end user can also schedule IVR system actions for performance at a later time. For example, the end user can schedule the payment of a bill over the phone using the chatbot 110. The end user can store account and credit card information locally on their device. This information is used in addition to the IVR instruction set by the chatbot 110 on a monthly basis to contact the IVR system 125 and pay a recurring bill.

In one embodiment, the chatbot 110 can generate a visual representation of the IVR tree for the end user. For example, the chatbot 110 can create a series of messages within a messaging application that correspond to the various tiers of the IVR tree. The chatbot 110 can transmit to the messaging application a first message that includes "Select your language, press 1 for English or 2 for Spanish." The message can be displayed through a messaging application that the user is utilizing to interact with the chatbot 110. The chatbot 110 can relay an ordered set of messages that correspond to the IVR tree. The chatbot 110 receives responses from the end user through the messaging application to traverse the IVR tree.

Figure 3:
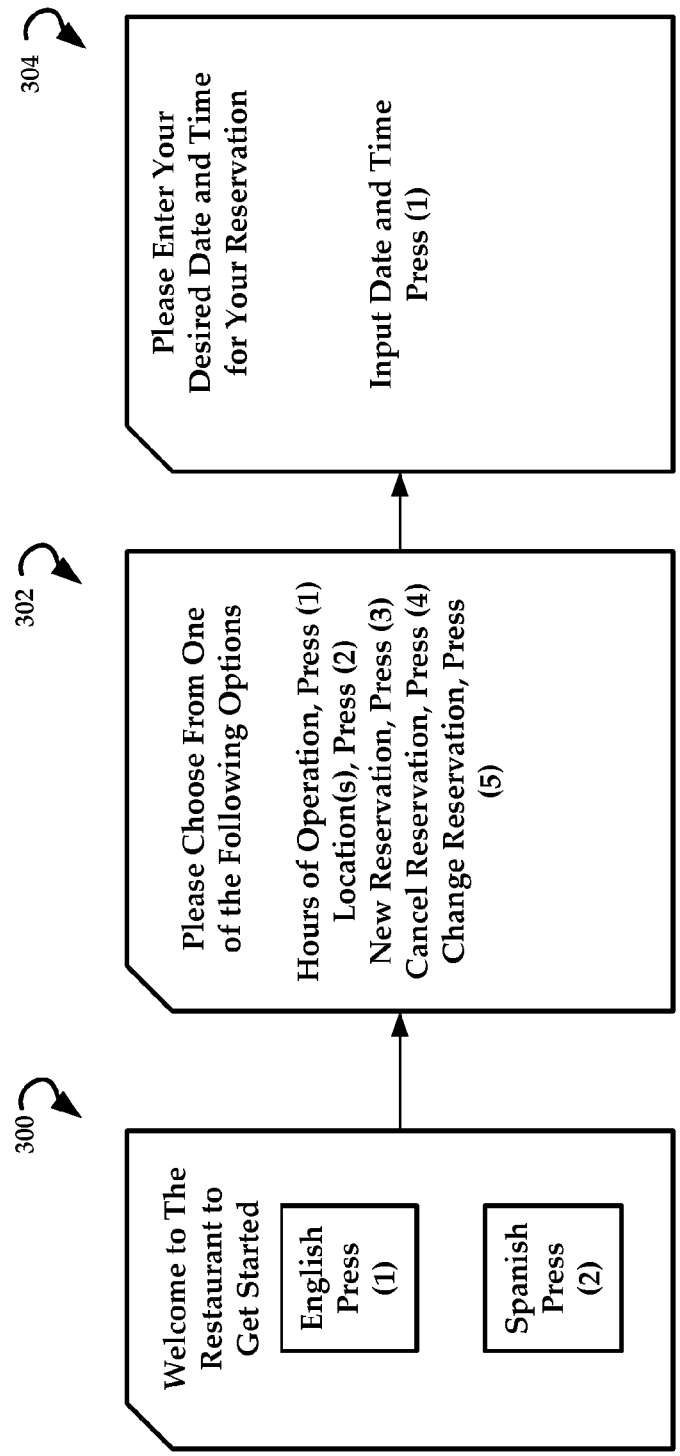
FIG. 3 illustrates a series of GUIs that are generated from the IVR tree.

In some embodiments, the chatbot 110 can generate a graphical user interface with selectable buttons using the selectable telephonic options of the menu structure obtained from the IVR system. Example GUIs are illustrated in FIG. 3. A main GUI 300 is generated that includes the language options. Selection of a language results in the display of a second GUI 302 that includes second tier menu options selected from the IVR tree. Selection of a second tier menu option results in the generation and display of a third GUI 304 that includes additional IVR menu options.

In some embodiments, the GUI (e.g. GUIs 300-304) comprises selectable buttons that represent the selectable telephonic options of the menu structure obtained from the IVR system 125.

It will be understood that the creation of GUI representations (e.g. GUIs 300-304) of the IVR tree is particularly advantageous in assisting individuals with hearing impairments in accessing and utilizing IVR menus, although the GUIs (e.g. GUIs 300-304) are not so limited.

The GUIs (e.g. GUIs 300-304) can be presented in an application or on a website in some embodiments.

To assist in management of chatbot sessions, the chatbot 110 can be configured to generate an audit trail of a chatbot/IVR system session. In one embodiment this session includes a telecommunications session between the chatbot and the IVR system. The audit trail can be used to identify fraudulent activity, such as attempted hacking of an account. For example, the audit trail can identify that the chatbot has been used to input various account details that were discrepant. The end user can utilize the audit trail to determine that they potentially entered an incorrect account number.

The presence of a detailed audit trail to record and timestamp activity can be used for purposes of conversation optimization, error reduction, abandonment, and so forth. Other similar machine learning optimizations are also contemplated for the chatbot interface, potentially helping overcome issues in the IVR system itself such as those mentioned above.

In some embodiments, injection of authentication information such as a user ID, a PIN, biometric info (e.g., fingerprint, retina scan, and so forth) during a chatbot session can be executed. The authentication information can be provided by a mobile device, a captcha-like human authentication interface, or so forth, to enhance IVR errors and further reduce the risk of fraudulent activity via the chatbot. These processes encompass machine learning capabilities of the systems of the present disclosure to learn from IVR session data.

Audit trails can be monitored to find patterns associated with inappropriate or fraudulent activity to thwart such activities, provide alerts to both internal and external parties, fraud departments, end user(s), law enforcement, and so forth. In some embodiments, the audit trails are utilized for post mortem analysis of fraudulent activity and to build protections against future attacks/abuse.

The use of pre-stored account information by the chatbot 110 to complete an action ensures that the chatbot 110 communicates correct information to the IVR system 125. For example, when a user is required to input touch tone keypad inputs of a credit card number or account number, the user may input incorrect information leading to delay and frustration. The chatbot 110 can utilize stored account or credit card information to ensure that the inputting of information into the IVR system 125 is correct each time.

Figure 4:
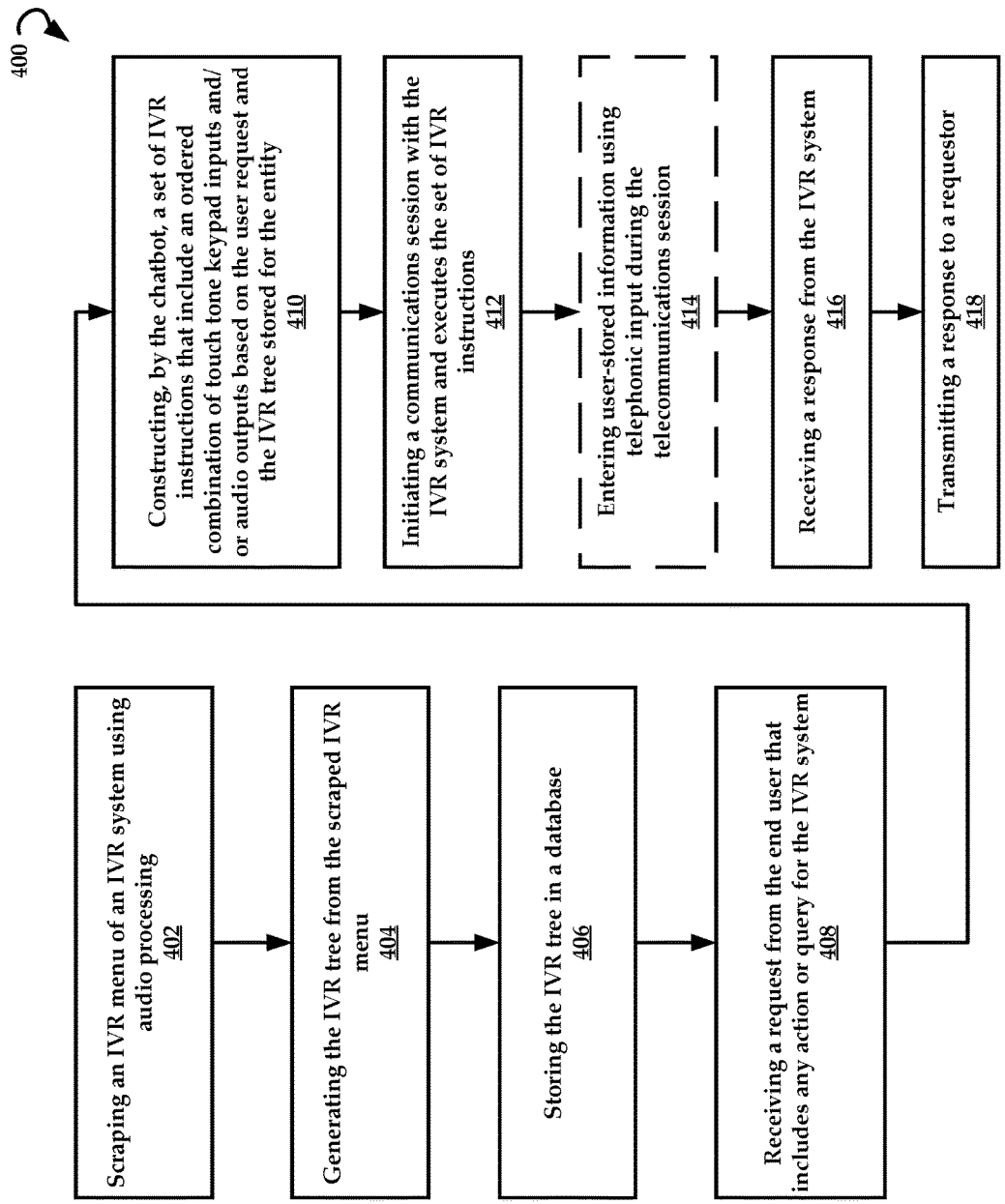
FIG. 4 is a flowchart of an example method of the present disclosure.

FIG. 4 is a flowchart of an example method 400 of the present disclosure for providing the chatbot-IVR system functionalities described herein. In one embodiment, the method includes a step 402 of a chatbot scraping an IVR menu of an IVR system using audio processing. To be sure, the chatbot can first establish a communications session with the IVR system and parse through the IVR menu.

Next, the method 400 includes a step 404 of generating the IVR tree from the scraped IVR menu. The IVR tree is a hierarchical representation of the IVR tree created from the audio prompts output by the IVR system. Again, this includes determining keywords and/or phrases that are indicative of options/selections within the IVR menu.

The method 400 includes a step 406 of storing the IVR tree in a database. At a later point in time, a user enters a request for the chatbot to complete. This can include an action or request that is executed in an autonomous manner by the chatbot.

The method 400 includes a step 408 of receiving a request from the end user that includes any action or query for the IVR system. Essentially, the request can specify any action or information that the end user needs from the IVR system.

Once the request is received, the method 400 includes a step 410 of constructing, by the chatbot, a set of IVR instructions that include an ordered combination of touch tone keypad inputs and/or audio outputs based on the user request and the IVR tree stored for the entity. For example, the chatbot converts the voice command "I want to cancel my reservation for The Restaurant for 7:00 pm on Friday" into a series of touch tone keypad inputs that traverse the IVR tree.

Once constructed, the method 400 includes a step 412 of the chatbot initiating a communications session with the IVR system and executing the set of IVR instructions.

In one embodiment, the method 400 includes a step 414 of the chatbot entering user-stored information using telephonic input during the telecommunications session. For example, the chatbot can enter a telephone number or other information.

Next, the method 400 includes a step 416 of receiving a response from the IVR system, such as an audible response that the reservation has been canceled. The method 400 includes a step 418 of transmitting a response to a requestor. The response "Reservation Canceled" can be displayed on the messaging application that the user utilized to input their request. In some embodiments, the response can be converted into a natural language version of the response that is output in an audible format to the user.

As mentioned above, the chatbots of the present disclosure can be configured to provide translatability between users and IVR systems. The chatbots can provide a user with the ability to interact with an IVR system that utilizes a different language than that used by the user.

In one embodiment, the IVR system is implemented using a first language such as French, but the user speaks a second language which is English. The chatbot (or chatbot server) implements translational capabilities to provide translation between the first language and the second language in such a way that the user can utilize the chatbot to communicate with the IVR system using the second language. The user can enter requests in their native, second language. The chatbot can interpret the request and create a set of IVR instructions that allow the chatbot to traverse the IVR menu of the IVR system. Again, this IVR instruction set is created from an IVR tree that was previously obtained by the chatbot parsing/mapping the IVR menu. The chatbot can determine equivalence between words and phrases in the request with the selections available in the IVR menu. That is, each of the selections in the IVR menu is associated with words or phrases in the first language. The chatbot looks for matches between words in the request and in the IVR menu/tree.

Figure 5:
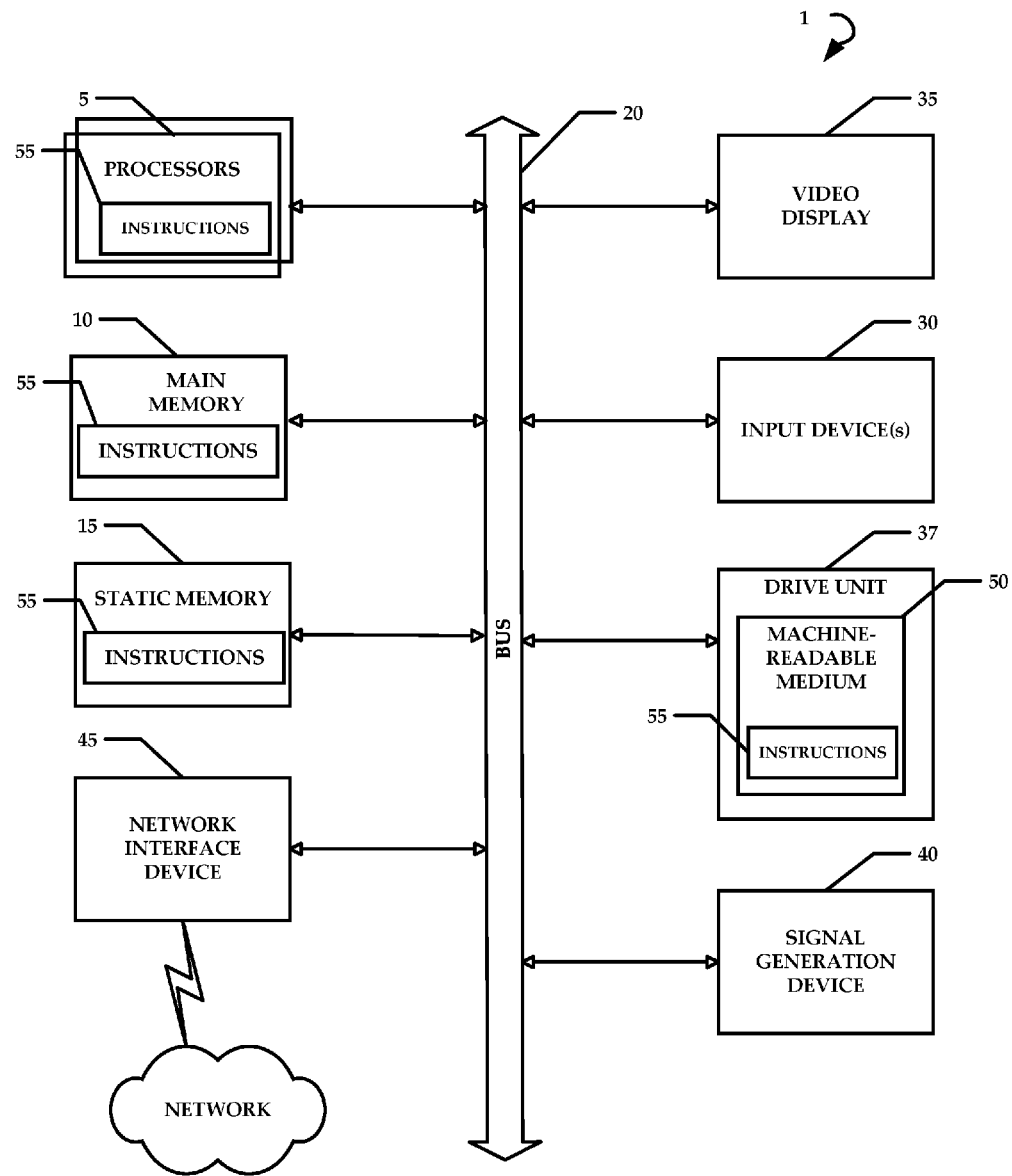
FIG. 5 is an example computing device that can be used to practice aspects of the present technology.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10, within the processors 5, and/or within the static memory 15 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
    traversing an interactive voice response (IVR) system using a chatbot;
    determining, via the chatbot, a menu structure of the IVR system using audio processing, the menu structure comprising selectable telephonic options;
    storing the menu structure in a database;
    receiving a request to establish a telecommunications session from a messaging application on a client device, the request comprising a task;
    determining, via natural language parsing, the task from the request;
    creating, based on the determining the task, an instruction set; and
    executing, based on the instruction set, the task against the menu structure by the chatbot entering one or more of the selectable telephonic options.

2. The method according to claim 1, further comprising:
    establishing the telecommunications session with the IVR system;
    receiving a response from the IVR system; and
    transmitting a response to a requestor.

3. The method according to claim 2, further comprising generating a graphical user interface with selectable buttons using the selectable telephonic options of the menu structure obtained from the IVR system.

4. The method according to claim 3, wherein the selectable telephonic options are presented as a menu with a messaging application or on a webpage.

5. The method according to claim 1, further comprising obtaining a relative or absolute location of a user accessing the IVR system through the chatbot.

6. The method according to claim 5, further comprising generating an audit trail of the telecommunications session.

7. The method according to claim 1, wherein determining the menu structure of the IVR system comprises:
    utilizing natural language parsing of voice prompts of the IVR system to identify keywords and phrases that are indicative of the selectable telephonic options; and
    building the menu structure that comprises an IVR tree of the IVR system based on the keywords and phrases.

8. The method according to claim 1, further comprising:
    establishing the telecommunications session with the IVR system;
    entering user-stored information using telephonic input during the telecommunications session;
    receiving a response from the IVR system; and
    transmitting a response to a requestor.

9. A method, comprising:
    scraping an interactive voice response (IVR) menu of an IVR system using audio processing, the IVR system being implemented using a first language; and
    providing a chatbot that interacts with a user by:
        receiving a request from the user, the request being received in a second language that is different than the first language;
        creating a set of IVR instructions based on a translation of the request between the second language and the first language;
        responding to the request from the user using a scraped IVR tree in the first language; and
        generating a visual representation of the scraped IVR tree.

10. The method according to claim 9, wherein the request is received by the chatbot from the user through any of textual content entered into a website, a message entered into a messaging application, and a spoken input.

11. The method according to claim 9, further comprising the chatbot dialing a telephone number of the IVR system.

12. The method according to claim 9, further comprising the chatbot periodically updating the IVR tree by scraping the IVR system over time.

13. The method according to claim 9, wherein responding to the request from the user using the scraped IVR tree comprises the chatbot entering a series of simulated touch-tone keypad selections in accordance with the request of the user.

14. The method according to claim 9, further comprising:
    establishing a telecommunications session with the IVR system;
    executing a task within the IVR system using the IVR tree;
    receiving a response from the IVR system; and
    generating a natural language version of the response that is output in an audible format to the user.

15. The method according to claim 9, further comprising generating a graphical user interface with selectable buttons using selectable telephonic options of the IVR tree.

16. The method according to claim 15, wherein the selectable telephonic options are presented as a menu with a messaging application or on a webpage.

17. The method according to claim 9, further comprising generating an audit trail when responding to the request from the user using the scraped IVR tree.

18. The method according to claim 17, wherein the audit trail comprises a recording of a chatbot session and timestamps for the chatbot session.

19. The method according to claim 18, further comprising optimizing execution of chatbot responses to a future request using the audit trail.

20. The method according to claim 18, further comprising optimizing the IVR system and chatbot responses using the audit trail.

21. The method according to claim 9, further comprising providing authentication information to the chatbot during an IVR session.

22. The method according to claim 17, further comprising reviewing the audit trail for information that is indicative of fraudulent activity.

23. The method according to claim 22, further comprising:
monitoring the audit trail; and
detecting within the audit trail, patterns associated with inappropriate or fraudulent activity in order to thwart the inappropriate or fraudulent activity.

24. The method according to claim 23, further comprising transmitting an alert to an authorized party in response to the detecting patterns associated with inappropriate or fraudulent activity.

25. The method according to claim 23, further comprising updating the monitoring of the audit trail with information that is indicative of the inappropriate or fraudulent activity determined from current or prior monitored audit trails.

26. A method, comprising:
scraping an interactive voice response (IVR) menu of an IVR system using audio processing, the scraping the IVR menu of the IVR system comprising:
determining a first prompt having a set of first selectable telephonic options,
identifying each first selectable telephonic option of the first prompt, and
traversing each first selectable telephonic option of the first prompt; and
providing a chatbot that interacts with a user by:
receiving a request from the user, the request comprising a task;
determining, via natural language parsing, the task from the request;
creating, based on the determining the task, an instruction set; and
executing, based on the instruction set, the task against the scraped IVR menu by entering one or more selectable telephonic options.

* * * * *